May 10, 1960 W. T. RENTSCHLER 2,935,920
INTERCHANGEABLE LENS CAMERA WITH COUPLED EXPOSURE METER
Filed July 11, 1957 3 Sheets-Sheet 1

INVENTOR.
Waldemar T. Rentschler
BY
Munn, Liddy, Daniels & March
ATTORNEYS

May 10, 1960    W. T. RENTSCHLER    2,935,920
INTERCHANGEABLE LENS CAMERA WITH COUPLED EXPOSURE METER
Filed July 11, 1957    3 Sheets-Sheet 2
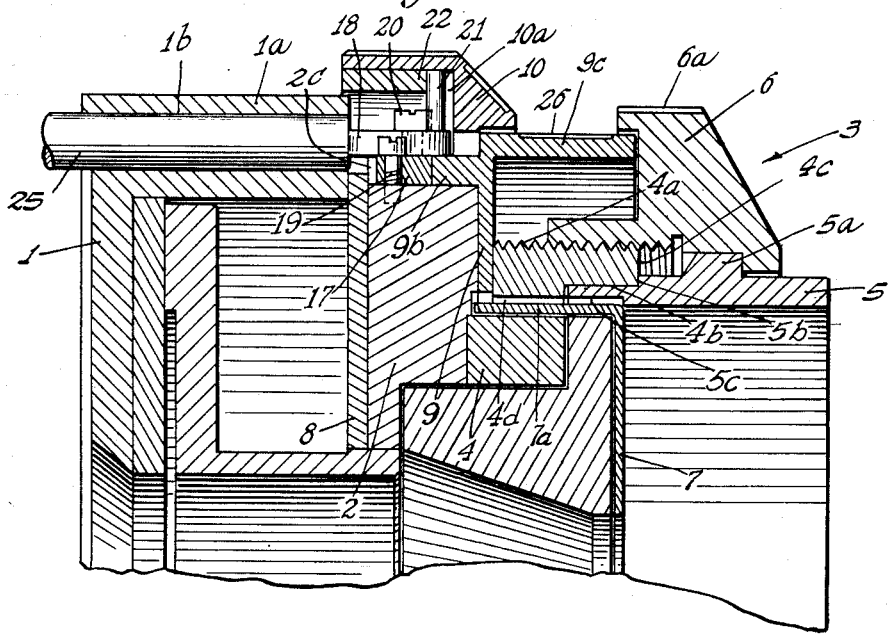
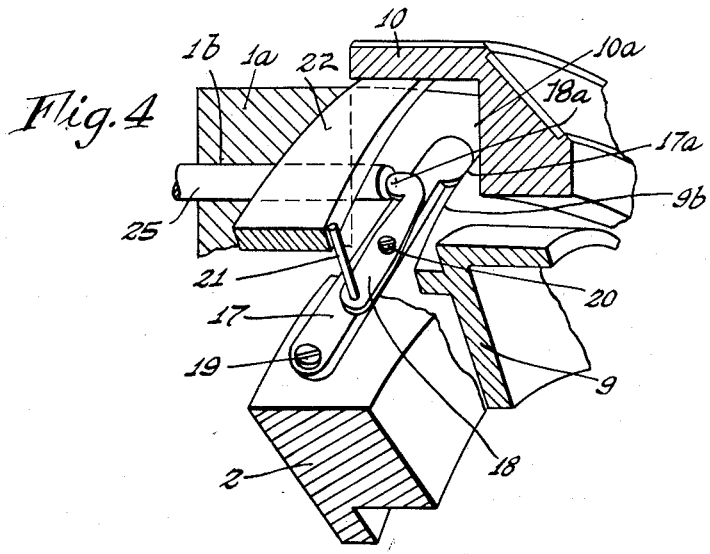
INVENTOR.
Waldemar T. Rentschler
BY
Munn, Liddy, Daniels & March
ATTORNEYS

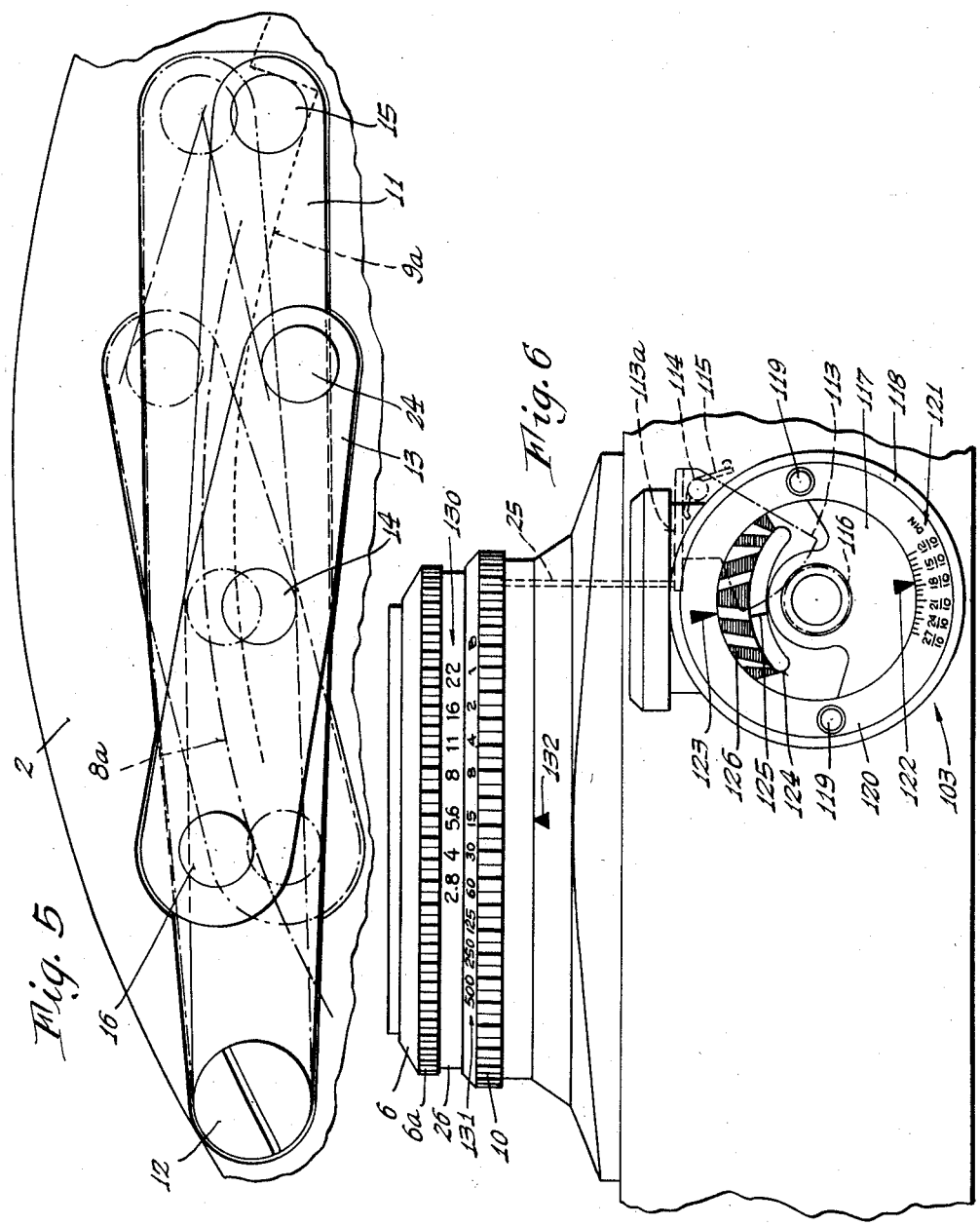

United States Patent Office 2,935,920
Patented May 10, 1960

2,935,920

INTERCHANGEABLE LENS CAMERA WITH COUPLED EXPOSURE METER

Waldemar T. Rentschler, Calmbach (Enz), Germany, assignor to Alfred Gauthier, G.m.b.H., Calmbach (Enz), Germany, a corporation of Germany Application July 11, 1957, Serial No. 671,276

Claims priority, application Germany July 17, 1956

13 Claims. (Cl. 95—10)

This invention relates to photographic cameras, and more particularly to cameras wherein adjustable members of the shutter structures are coupled with an exposure meter.

The present invention constitutes a species of the generic invention disclosed and claimed in my copending patent application, Serial Number 639,986, filed February 13, 1957, and entitled "Adjustable Camera Structure and Coupled Exposure Meter," now Patent No. 2,887,026, issued May 19, 1959.

In this copending application there is disclosed a camera shutter structure on which a first lever is pivotally mounted, said first lever pivotally carrying a second lever which latter influences the tracing member of an exposure meter. The two levers are actuated by two separate cams which are connected respectively with the diaphragm-setting member and speed-setting member of the shutter structure.

The organization as provided in this copending application is especially advantageous in enabling a semi-automatic speed setting to be had for camera-mounted shutter structures, in a convenient, practical and reliable manner. In this prior application the lens and shutter structures were constituted as a unit wherein the speed-setting and diaphragm-setting members were permanently mounted.

An object of the present invention is to provide a novel and improved semi-automatic setting means along the lines of that disclosed in my prior application, which means is adaptable for cameras wherein removable and interchangeable lens assemblies are employed, having built-in diaphragms.

In accomplishing this object I constitute the cam, which is disposed on the shutter structure and which controls the lever made responsive to the diaphragm setting, so that a separable but reliable driving connection may be established therewith from the diaphragm-setting mechanism of any of the interchangeable lens assemblies when such assembly is being applied to the shutter structure. Thus, there is not only had the advantage obtained from interchangeable lens assemblies but at the same time there is retained the advantageous semi-automatic speed-setting feature forming the subject of my generic invention above referred to.

Other features and advantages of the present invention will be hereinafter disclosed with reference to the following description and the accompanying drawings, describing two different specific embodiments, in which—

Fig. 3 is a view similar to that of Fig. 1, but showing a modified form of coupling mechanism between the setting members and the exposure meter.

Fig. 4 is a fragmentary perspective view, with parts broken away and shown in section, illustrating further the coupling device employed in the embodiment of Fig. 3.

Fig. 5 is an enlarged plan or face view of the levers illustrated in perspective in Fig. 2, shown in two different positions.

Fig. 6 is a schematic top view of a camera with shutter structure and exposure meter, the latter being coupled with the speed and diaphragm setting members by the present improved coupling device as illustrated in Figs. 3 and 4.

Figure 1:
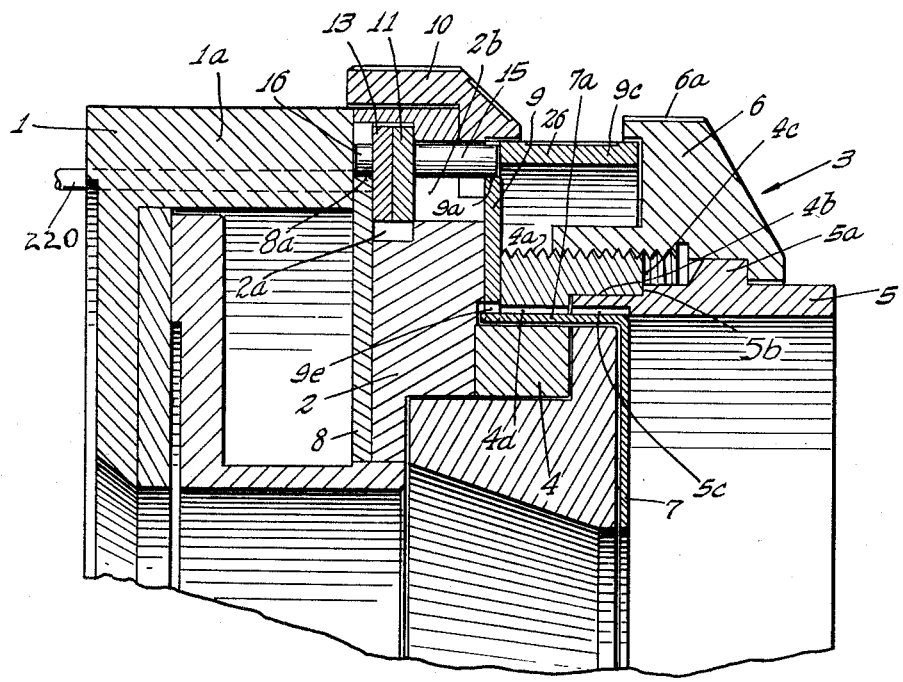
Fig. 1 is an enlarged fragmentary longitudinal or axial sectional view showing a portion of a photographic shutter structure and an interchangeable lens assembly attached thereto. The diaphragm-setting mechanism of the lens assembly and the speed-setting member of the shutter structure are coupled, in accordance with the invention, by a transmission device to an exposure meter.

As mentioned above, the invention disclosed in my prior-filed copending application relates to a coupling means between speed and diaphragm setting members and exposure meter, in a camera having the diaphragm incorporated permanently in the shutter structure. In this type of construction the lever which is influenced by the diaphragm-setting member is actuated by a controlling cam which is connected to the diaphragm setting ring, the latter being arranged in the well-known manner common with shutters of this type, at the rear of the shutter housing.

In accordance with the present invention, which has for its object the creation of a coupling device along the lines of my generic invention but adaptable to cameras which employ interchangeable lens assemblies having built-in diaphragms arranged in front of the shutter blades, the lever which is influenced by the diaphragm-setting means is actuated by a cam permanently carried at the shutter housing of the camera but adapted to have a separable driving connection with the diaphragm-adjusting means of the various interchangeable lens assemblies intended for use with the camera. The said controlling cam is mounted on a support or carrier which is movably borne at the shutter housing and is especially adapted to provide said separable driving connection.

In the present improved construction the mounting of the cam and carrier therefor, which has the separable driving connection, as a permanent part of the camera or shutter housing has the advantage that uniformity is obtained in the cam action, which is not adversely affected when replacing on the shutter housing one interchangeable lens assembly with another. Moreover, by such organization the controlling cam may not only be accurately set and initially adjusted, but it may be completely enclosed and covered, thereby to maintain its accuracy and reliability of operation.

Moreover, by such organization only a single cam and cam carrier are utilized, for all the different lens assemblies, thereby effecting an economy in the use of parts.

Referring now to Figs. 1 through 4, the camera has a housing for the shutter, said housing being indicated by the numeral 1. At its front, the housing 1 is covered by a cover plate 2 which is supported on the front edge or surface of the housing side wall 1a, being secured thereto in any suitable manner, as by screws (not shown).

For the purpose of securing interchangeable lens assemblies, such as the lens assembly 3, to the shutter housing, the front plate 2 is provided with a nozzle 4 having an external screw thread 4a accommodating an internally-threaded clamping ring 6 of an interchangeable lens assembly in the well known manner. The ring 6 engages an annular shoulder 5a of a lens tube 5, and is provided with knurling 6a to enable it to be readily turned by hand.

It will be understood, of course, that the ring 6 and nozzle 4 may have other types of fastening means, as for example a bayonet catch, etc.

The lens assembly 3 is centralized by the provision of an interior cylindrical wall 4b formed in the nozzle 4, into which a reduced-diameter portion of the lens tube 5 extends. The lens tube 5 is positioned axially by engagement between an annular shoulder 5b thereof and an annular face or front surface 4c of the nozzle 4.

For the purpose of actuating the blades of the diaphragm (not shown) there is rotatably mounted within the lens assembly 3 a flat diaphragm ring 7, having a bent, axially and rearwardly extended arm 7a which passes through a clearance slot 5c in the lens tube 5. The arm 7a thus projects from the rear of the lens assembly 3, and cooperates with a carrier member carried at the shutter housing of the camera, to constitute a separable driving connection as will be described later in detail.

The lens assembly 3 is of the type wherein the diaphragm ring 7 does not have any rotative movement when the distance-setting member is being adjusted, but instead remains either fixed or has only a limited axial movement corresponding with the shifting movement of the distance-setting member of the lens assembly.

In the two embodiments of the invention illustrated herein the carrier member having the cam and which cooperates with the arm 7a of the diaphragm ring is constituted as a ring or disc, and also the speed-setting member of the shutter housing is constituted as a ring or disc. By this organization the coupling device of the present invention may be readily incorporated in shutter housings without great change, inasmuch as the controlling cams of the rings or discs may then be arranged in any angular positions as might be found necessary or desirable.

In accordance with this invention the two ring-shaped cam carriers are juxtaposed to the cover plate 2. As seen in Fig. 1, the cam carrier actuated for adjustment of the speed-setting comprises a ring 8 located at the rear of the cover plate 2, and the cam carrier actuated during diaphragm adjustments constitutes the ring 9 disposed at the front of the cover plate 2. The front disposition of the carrier ring 9 is advantageous in enabling it to be easily coupled to the diaphragm-actuating ring 7, through the medium of the arm 7a thereof.

To provide clearance for the arm 7a at the nozzle 4, the latter is provided with a slot 4d through which the arm may extend when the interchangeable lens assembly 3 is being applied to the shutter housing. As shown, the ring 9 may have a notch 9e into which the arm 7a extends, to effect a separable driving connection thereto. It will be understood, of course, that other forms of driving connections may be provided, however.

For the purpose of actuating the speed setting ring or carrier 8 there is provided around the periphery of the front plate 2 a manually operable ring 10, overlapping the edge of the plate 2 and connected with the ring 8 in any suitable manner (not shown). For example, the ring 8 may have an outwardly radially extending arm engaged in an internal recess in the manually operable ring 10, said arm and recess being well known in the art and therefore not shown.

As thus organized, the carrier rings 8 and 9 both bear against the front cover plate 2 of the camera structure, thereby effecting an accurate positioning of the rings and enabling the greatest possible accuracy to be had in the coupling device.

In the two embodiments of the invention illustrated herein different arrangements of the lever members of the coupling device are shown. In one organization, that illustrated in Figs. 1 and 2 the lever members are disposed in planes perpendicular to the shutter axis and the controlling cams for such levers have a lateral or radial displacement, effecting radial movement of the levers. In the embodiment of the invention illustrated in Figs. 3, 4 and 6 the lever parts are movable axially with respect to the shutter housing, and the controlling cams effect an axial displacement of the levers and in an axial direction.

Figure 2:
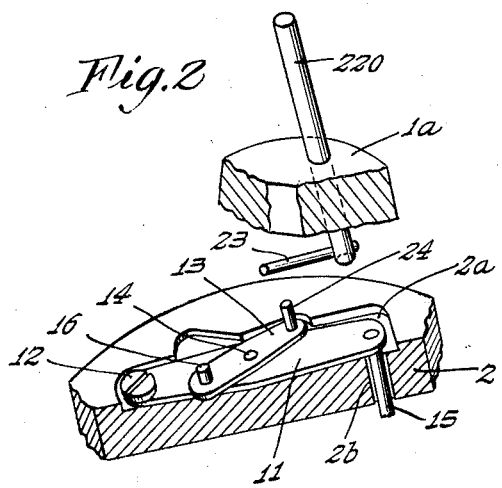
Fig. 2 is a fragmentary exploded perspective view of a portion of the lever-type coupling mechanism employed between the setting members and the exposure meter, there being shown a portion of a cover plate for the housing of the shutter structure, which plate carries the said levers.

In the organization of Figs. 1 and 2 no additional space is required radially, and therefore the shutter housing and lens assembly may have the smallest possible diameter. This organization may be employed therefor where a small shutter housing diameter is of the greatest importance. The embodiments of the invention illustrated in Figs. 3 and 4 show an arrangement which does not require additional space in an axial direction, and this embodiment would be employed where small dimensions axially of the shutter housing are important. It is further possible, however as illustrated in the two disclosed embodiments, to incorporate either coupling means so that no additional space is required either radially or axially.

In both of the illustrated embodiments of the invention I utilize the front cover plate 2 as a mounting for the lever parts of the coupling mechanism, and by this organization in conjunction with the arrangement of the cam carrier rings 8 and 9 on opposite sides of the front plate 2 an extremely compact structure is effected. Moreover, by such organization the lever parts as well as the carrier rings 8 and 9 will all be mounted on the same member, i.e., the front cover plate 2 thereby resulting in the greatest possible accuracy and reliability of the coupling mechanism.

In Figs. 1, 2 and 5 the lever parts are disposed between the speed setting ring 8 and the front surface of the cover plate 2, in a space 2a provided by suitably milling the cover plate. In this space there is disposed a first one-armed lever 11 which is pivotally mounted about a pivot stud 12 secured in the plate 2. On the first lever 11 there is pivotally mounted a second and two-armed lever 13, carried by a pivot pin 14 secured to the lever 11.

The first lever 11 has a cylindrical pin 15 which extends through a clearance slot 2b in the plate 2, said pin being engageable with a cam 9a provided on the carrier ring 9. The two-armed lever 13 has a pin 16, engageable with a cam 8a carried by the speed-setting ring 8. The lever 13 also has a driving connection with the tracing member of an exposure meter, as will be described further on.

Referring now to Figs. 3 and 4, there is provided a first lever 17 and a second lever 18, disposed at the circumference of the front plate 2 in a groove 2c milled in said plate. The first lever 17 is pivotally carried by a fixed pivot post 19 secured in the plate 2, and the second lever 18 is pivotally mounted on a pivot pin 20 fixed on the lever 17. By means of a rounded nose 17a, the lever 17 engages and constitutes a cam follower for a cam 9b carried by a cam ring 9, said cam acting axially of the shutter housing. The second lever 18 has a cylindrical pin 21 engageable with a cam 22 disposed within and fixed to the speed-setting ring 10 at the shutter housing. The said ring may be suitably recessed as shown at 10a to accommodate the cam ring 22, as will be understood.

I provide further a transmission device at the shutter housing, for effecting a driving connection between either of the levers 13 or 18 and the tracing member of the exposure meter. In the embodiment of the invention illustrated in Figs. 1, 2 and 5 the said transmission device is constituted as a turnable shaft 220 arranged parallel to the shutter axis and having a bearing in the shutter housing 1a. At one end, the shaft 220 has an arm 23 in the form of a cylindrical pin lying in a plane perpendicular to the shutter axis, said pin cooperating with the pin 24 on the lever 13.

In the embodiment of the invention illustrated in Figs. 3, 4 and 6 the transmission device comprises an axially shiftable pin 25 arranged to be moved in a direction parallel to the shutter axis, said pin engaging a rounded nose 18a of the lever 18 under the action of a spring 115 disposed at the exposure meter. The above manner of constituting the transmission device between the lever parts and the exposure meter constitutes a simple and effective means for actuating the tracing member of the latter.

The axially movable pin 25 is supported in a bore 1b in the shutter housing side wall 1a, and accordingly for both types of transmission there is not required any additional space at the shutter. With this organization the housing side wall 1a must of course have sufficient thickness, and if this is not available then a bearing sleeve may be provided on the side wall, as will be readily understood.

For the purpose of eliminating the necessity for a special diaphragm-setting member on the interchangeable lens assembly 3, in accordance with the invention, the cam ring 9 is constituted also as a diaphragm-setting ring. In accomplishing this, the ring 9 has a cylindrical projection or flange 9c, which may be manually actuated and on which a scale band 26 is provided, carrying a diaphragm scale 130. Also, the cylindrical flange or projection 9c may serve as a carrier for a detent member (not drawn) which in a well known manner may be accommodated in notches (not drawn) formed in the ring 10. By such organization it is possible, as will be understood, to effect different relative coupled positions between the speed-setting member 10 and diaphragm setting member 9, to maintain predetermined adjusted exposure values.

Referring now to Fig. 6 there is shown an exposure meter 103 on the camera structure, adapted for cooperation with the transmission pin 25. As shown, the pin 25 engages a lug 113a of a toothed segment 113 which is pivotally carried on an axis or pivot 114 secured to the camera housing. The lug 113a extends in a vertical direction with respect to the plane of the film which is disposed in the camera ready for exposure.

The segment 113 is under the action of a wire spring 115 arranged about the pivot 114, and the segment engages a gear 116 which is connected with a disk-shaped carrier segment 117 having fixedly secured thereto a ring 118.

Turnably carried by the ring 118 is a second ring 120, having manually engageable pins 119 by means of which it may be manually shifted for adjustment. The parts 118 and 120 constitute together the tracing member above referred to, and the ring 120 may be provided with a film sensitivity scale 121 which may be referred to as an index mark 122 carried by the segment 117. Also, the ring 120 carries an index mark 123 cooperable with an indicator or pointer 125 of the measuring device of the exposure meter, said pointer being movable under a window 124. For obtaining a linear setting in the case of non-logarithmic characteristic of the measuring device, there is provided between the window 124 and the inner diameter of the ring 120 a channel scale 126, to which the index mark 123 and the pointer 125 may be referred.

On the cylindrical portion 9c of the diaphragm-setting ring 9 there is disposed, a scale 130, and on the speed-setting ring 10 there is disposed a speed scale 131. Both scales may be referred to an index mark 132 fixed on the shutter housing.

As already mentioned, for the purpose of coupling the speed and diaphragm setting rings, any well-known releasable coupling device may be provided, such device being not shown herein. Normally, the setting rings 10 and 9 are coupled for simultaneous movement, and to release the rings for movement independently of each other a handle (not shown) is depressed.

The adjustment of the camera setting mechanism, in accordance with the indications of the exposure meter, is as follows:

(1) *Setting the film sensitivity.*—For this purpose the ring 120 of the exposure meter is turned to cause the index mark 122 to indicate on the scale 121 the sensibility figure of the film being used.

(2) *Setting the time-diaphragm proportion corresponding to the exposure meter indication.*—After effecting the setting for the film sensibility, the release handle coupling the rings 10 and 9 is actuated to uncouple the same from each other. Then, either the diaphragm setting ring 9 or the speed setting ring 10, as one likes, is turned until the index mark 123 on the ring 120 corresponds to the position of the measuring device pointer 125 as determined by the channel scale 126. Thus the time-diaphragm proportion corresponding to the given light conditions and to the sensibility of the film being used is now adjusted, and the setting rings 10 and 9 may be coupled anew, by releasing the actuating handle. If, during such movement of a setting ring, it reaches one of its end positions without effecting coincidence between the index mark 123 and the pointer 125, then such coincidence must be effected by actuation of the other setting ring in the required direction.

It will be understood that this actuation of the setting rings displaces the transmission pin 25 in the manner already described above, in connection with Figs. 3 and 4.

(3) *Diaphragm-time selection.*—Selecting a diaphragm-time pair of values suitable for the subject which is to be photographed, may now be effected by turning the assemblage constituting the coupled setting rings 9 and 10, without actuating or depressing the release handle (not shown) which uncouples the rings. Such turning, as described in my prior-filed application referred to above, will not change the position of the transmission pin 25 and accordingly it will not change the position of the index mark 123.

The cooperation of the parts of the coupling devices in both embodiments of the invention, when turning the rings 9 and/or 10 respectively, is similar to that described in my referred-to copending application. Fig. 5 illustrates in full and broken outline the positions of the levers 11, 13 when setting to the smallest and greatest exposure values possible, with the coupling mechanism of Figs. 1 and 2.

Selecting a pair of values of speed-aperture adapted to the subject desired to be taken, is effected by turning the coupled speed and diaphragm setting rings 9 and 10. When selecting the speed-aperture values in this manner, there is no turning of the shaft 220 of Fig. 1, or axial shifting of the pin 25 in Fig. 3, and thus there is no change in the position of the tracing member of the exposure meter.

It will be now readily understood that, in accordance with the arrangement of the levers 11, 13 and 17, 18 in the two illustrated embodiments of the invention, no additional space is required for such levers since they are accommodated in recesses or grooves milled in the front plate 2 covering the shutter. Accordingly, by virtue of the extremely compact arrangement no space is required beyond that defined by the overall dimensions of a shutter and associated mechanism not having the present coupling device.

The present invention is seen to provide, therefore, an advantageous and reliable coupling device having the advantages set forth for the structure of my copending application referred to, yet which is adaptable for cameras having interchangeable lens assemblies provided with built-in diaphragms. Moreover, the present invention utilizes a minimum number of parts and assemblies, and is simple and extremely reliable and accurate in its functioning.

I claim:

1. In a photographic camera having a shutter housing and a shutter-speed-setting member at said housing, and having an exposure meter provided with a tracing member, in combination, an interchangeable lens assembly having a diaphragm and a diaphragm setting member; means removably mounting said lens assembly on said shutter housing; a first lever pivotally mounted at said shutter housing; a second lever pivotally mounted on said first lever and having a pivot on and movable with the first lever; means coupling said second lever to the said tracing member to actuate the latter in response to movement of the second of said levers; means coupling one lever to the speed setting member for actuation thereby; and cooperable separable driving means at said shutter housing and at said lens assembly, coupling the other one of said levers to the diaphragm setting member for actuation thereby, said separable driving means enabling the lens assembly to be removed and replaced by another interchangeable lens assembly the diaphragm setting member of which will then be coupled to actuate said other lever.

2. The invention as defined in claim 1 in which the speed-setting member comprises a ring, and in which the means coupling the other lever to the diaphragm setting member includes a cam ring, both said rings being coaxial with respect to the shutter axis.

3. The invention as defined in claim 2 in there is a front plate at and covering the forward portion of the shutter housing, and in which the said rings are juxtaposed to said front plate.

4. The invention as defined in claim 3 in which the said levers are juxtaposed to the front plate, said first lever being pivotally secured to said plate.

5. The invention as defined in claim 2 in which the axis of the said first lever is disposed substantially normal to the shutter axis, and in which the ring of the speed-setting member has a cam for actuating the cooperable lever, said cam and the said cam ring acting axially of the shutter.

6. The invention as defined in claim 5 in which there is a front plate at and covering the forward portion of the shutter housing, in which the said rings are juxtaposed to the said front plate, and in which the said first lever is pivoted on said front plate.

7. The invention as defined in claim 2 in which the said cam ring has means by which it may be manually turned.

8. The invention as defined in claim 7 in which the said rings are juxtaposed and turn about a common axis and in which there are releasable coupling means for effecting concurrent turning of the rings.

9. The invention as defined in claim 2 in which the said levers are disposed in planes which are substantially normal to the axis of the shutter, and in which the ring of the speed-setting member has a cam for actuating the cooperable lever, said cam and the said cam ring acting in radial directions.

10. The invention as defined in claim 1 in which the means coupling the second lever to the tracing member comprises a transmission pin movably carried at the shutter housing.

11. The invention as defined in claim 10 in which the transmission pin comprises a turnable shaft extending parallel to the shutter axis, said shaft having a lateral arm disposed in a plane normal to the shutter axis, cooperating with said second lever.

12. The invention as defined in claim 10 in which the transmission pin engages the second lever and is axially movable in the housing parallel to the shutter axis, and in which there is a spring maintaining said pin in engagement with said second lever.

13. The invention as defined in claim 10 in which the transmission pin is carried by a side wall of the shutter housing.

References Cited in the file of this patent

UNITED STATES PATENTS

| | | |
|---|---|---|
| 2,252,573 | Leitz | Aug. 12, 1941 |
| 2,305,294 | Kuppenbender | Dec. 15, 1942 |
| 2,418,370 | Simmons | Apr. 1, 1947 |
| 2,596,328 | Dorsey | May 13, 1952 |

FOREIGN PATENTS

| | | |
|---|---|---|
| 756,282 | Germany | Feb. 23, 1952 |
| 1,111,448 | France | Oct. 26, 1955 |